(12) United States Patent
Aitchison et al.

(10) Patent No.: US 11,603,641 B2
(45) Date of Patent: Mar. 14, 2023

(54) FOUNDATION SYSTEM AND METHOD OF CONSTRUCTION

(71) Applicants: Allan Aitchison, Melbourne (AU); Doug Mackie, Melbourne (AU)

(72) Inventors: Allan Aitchison, Melbourne (AU); Doug Mackie, Melbourne (AU)

(*) Notice: Subject to any disclaimer, the term of this patent is extended or adjusted under 35 U.S.C. 154(b) by 94 days.

(21) Appl. No.: 16/955,624

(22) PCT Filed: Dec. 19, 2018

(86) PCT No.: PCT/AU2018/000263
§ 371 (c)(1),
(2) Date: Jun. 18, 2020

(87) PCT Pub. No.: WO2019/119015
PCT Pub. Date: Jun. 27, 2019

(65) Prior Publication Data
US 2021/0002844 A1  Jan. 7, 2021

(30) Foreign Application Priority Data

Dec. 19, 2017  (AU) .................... 2017905057

(51) Int. Cl.
*E02D 27/01* (2006.01)
*E02D 27/42* (2006.01)
(Continued)

(52) U.S. Cl.
CPC ............ *E02D 27/016* (2013.01); *E02D 27/42* (2013.01); *E04H 12/2238* (2013.01);
(Continued)

(58) Field of Classification Search
CPC ... E02D 27/016; E02D 27/42; E02D 2600/20; E02D 2200/1678; E02D 27/425; E02D 2300/002; E04H 12/34
(Continued)

(56) References Cited

U.S. PATENT DOCUMENTS 3,640,039 A * 2/1972 McKee ................. E04B 1/6158
                                                     52/396.04
4,098,047 A * 7/1978 Weber .................. E01C 11/106
                                                      404/68
(Continued)

FOREIGN PATENT DOCUMENTS

| JP | 2010065453 A | * | 3/2010 |
| JP | 2010065453 A | | 3/2010 |
| WO | 2019119015 A1 | | 6/2019 |

OTHER PUBLICATIONS

International Application Serial No. PCT/AU2018/000263, Search Report and Written Opinion dated Feb. 27, 2019, 13 pgs.

*Primary Examiner* — Brian E Glessner
*Assistant Examiner* — Adam G Barlow
(74) *Attorney, Agent, or Firm* — Kwan & Olynick LLP

(57) ABSTRACT

A foundation system for supporting a structure thereon comprising: a plurality of blocks, each block having at least three sides; at least two recesses formed in the at least three sides of each block; a plurality of connecting plates having a first end configured to be secured within a recess of a first block and a second end configured to be secured within a recess of an adjacent block such that the connecting plate extends between recesses of adjacent blocks to secure adjacent blocks together to form a foundation grid of said blocks;

(Continued)

and enclosure panels mountable to said blocks along an edge thereof so as to form an enclosure about a perimeter of the foundation grid.

16 Claims, 12 Drawing Sheets

(51) Int. Cl.
    *E04H 12/22*     (2006.01)
    *E04H 12/34*     (2006.01)
    *E04H 12/00*     (2006.01)

(52) U.S. Cl.
    CPC .... *E02D 27/425* (2013.01); *E02D 2200/1678* (2013.01); *E02D 2300/002* (2013.01); *E02D 2600/20* (2013.01); *E04H 12/34* (2013.01); *E04H 2012/006* (2013.01)

(58) Field of Classification Search
    USPC ........ 52/293.2, 295, 296, 223.7, 585.1, 604, 52/606; 405/15, 16, 17, 229, 244, 256
    See application file for complete search history.

(56) References Cited

U.S. PATENT DOCUMENTS

| | | | | |
|---|---|---|---|---|
| 4,372,705 A * | 2/1983 | Atkinson | ................... | E02B 3/14 405/16 |
| 4,474,504 A * | 10/1984 | Whitman | ................ | E01C 5/005 405/20 |
| 4,703,599 A * | 11/1987 | Pardo | ..................... | E02D 27/00 52/294 |
| 4,798,036 A * | 1/1989 | Pardo | ..................... | E02D 27/00 52/294 |
| 6,189,282 B1 * | 2/2001 | VanderWerf | ............. | E04B 2/14 52/582.1 |
| 6,702,522 B2 | 3/2004 | Silber | | |
| 8,302,357 B1 * | 11/2012 | Nolte | ................... | E02D 31/002 52/294 |
| 9,518,402 B1 * | 12/2016 | Kundel, Sr. | ............. | B66C 23/62 |
| 2010/0132270 A1 | 6/2010 | Willey et al. | | |
| 2011/0219713 A1 | 9/2011 | Zarraonandia | | |
| 2014/0150368 A1 * | 6/2014 | MacDonald | ........ | E04F 13/0801 52/604 |
| 2015/0259910 A1 * | 9/2015 | Montiel Reyes | ......... | E04B 2/18 52/604 |
| 2021/0002844 A1 * | 1/2021 | Aitchison | ............... | E02D 27/42 |
| 2022/0034058 A1 * | 2/2022 | Baykal | ..................... | E02D 5/52 |

* cited by examiner

FOUNDATION SYSTEM AND METHOD OF CONSTRUCTION

CROSS-REFERENCE TO RELATED APPLICATIONS

The present application is the U.S. national phase of PCT Application No. PCT/AU2018/000263 filed 19 Dec. 2018, which invention claims priority from Australian provisional patent application no. 2017905057 tiled 19 Dec. 2017, the entire contents of both applications which are incorporated herein by reference.

TECHNICAL FIELD

The present disclosure relates generally to foundation systems and in particular, to modular foundation systems used to support structures such as towers, antennas and the like, in a variety of different locations.

BACKGROUND

Structures such as antennas and towers are important for establishing communication networks across regions. In countries such as Australia, there exist considerable undeveloped areas between towns and cities that require the erection of towers and antennas to broaden the coverage of the communication network. In such locations, typically remote areas, there is generally no existing building infrastructure to mount an antenna thereto, and as such, a tower must be erected specifically for such a purpose.

To install a tower or similar structure at a remote site, requires a considerable outlay in relation to time and cost. This significant investment is often too large an obstacle in installing infrastructure at remote sites which has a significant adverse effect on establishing and maintaining good communication networks in regions where such communication is vital. Such time and cost is generally associated with constructing the tower, as in some instances it may be necessary for one or more construction crews to attend a site numerous times in order to complete the construction. For example, there is often a need to have a team initially survey the site, then level the site, another crew to set out the formwork for the base, a crew to pour the concrete for the base, a crew to remove the formwork after the concrete has cured, a crew to install fences and other security measures about the site, a crew to install the tower or antenna at the site and finally, a crew to install the electronic equipment and to manage the site with respect to ongoing power needs. Each of these steps generally require different teams of workers with different trade skills, which, given the travel time and need to provide accommodation and food for each worker at the remote site, can have a significant impact on the cost and time taken to install a communication tower.

Whilst a variety of modular foundation systems have been proposed for use in supporting structures, most of the proposed systems require complicated interlocking mechanisms and installation systems that do not readily lend themselves to installation in remote areas where access is limited and where conventional concrete pouring activities are not cost-effective or practical.

Thus, there is a need to provide a foundation system that can be simply installed and interlocked together and which can be transported on site and installed with minimal labour required. There is also a need to provide a foundation system that can be simply configured to suit a variety of applications and support a containment fencing and the like without the need for additional parts and labour.

The above references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

SUMMARY

According to a first aspect, there is provided a foundation system for supporting a structure thereon comprising:
   a plurality of blocks, each block having at least three sides;
   at least two recesses formed in the at least three sides of each block;
   a plurality of connecting plates having a first end configured to be secured within a recess of a first block and a second end configured to be secured within a recess of an adjacent block such that the connecting plate extends between recesses of adjacent blocks to secure adjacent blocks together to form a foundation grid of said blocks; and
   enclosure panels mountable to said blocks along an edge thereof so as to form an enclosure about a perimeter of the foundation grid.

In one embodiment, the structure is supported on the foundation grid of said blocks. In another embodiment, the structure is supported across a plurality of foundation grids of said blocks.

At least one of the blocks of the foundation grid may be configured to receive a foot member of the structure. The at least one block of the foundation grid may be configured to have a mounting system formed on a surface thereof to engage with the foot member of the structure. The mounting system may comprises a plurality of holes formed in a central region of the block with each hole configured to receive a bolt for securing the foot member of the structure to the block.

In one form, a plurality of blocks within the foundation grid may be configured to comprise the mounting system for supporting each foot member of the structure upon said foundation grid. In another form, a single block of a foundation grid is configured to comprise the mounting system for supporting a foot member of the structure such that the structure is supported across a plurality of foundation grids Each of the blocks may be reinforced to support the structure thereon.

Each of the blocks may be substantially triangular in configuration.

The recesses may be formed in the sides of each block adjacent an upper surface of the block. The recesses may be shaped to conform to the shape of the first end or second end of the connecting plate to be received in the recess such that when the connecting plate is received in the recess there is limited lateral movement of the connecting plate within the recess.

The recesses may have a hole formed therein that aligns with a hole formed in the first end or second end of the connecting plate to facilitate securing of the connecting plate within the recess by a securing member. The securing member may be a bolt or screw.

The connecting plates may have holes formed in both the first end and second end thereof.

The enclosure panels may be mountable to a free end of said connecting plates. The base of the enclosure panels may be mounted to the connecting plates. The enclosure panels may comprise an open structure, a closed structure or a combination of both an open structure and a closed structure.

The structure may be a communication tower or antenna. The structure may further comprise a controller housing which is configured to be securely mounted to at least one of the plurality of blocks.

According to another aspect of the invention, there is provided a method of constructing a structure at a remote location comprising:

forming a level ground surface at the remote location;
creating a foundation grid of interconnected blocks upon said level ground surface;
mounting at least one leg of said structure to a surface of one of said blocks of said foundation grid such that all legs of the structure are supported by at least one foundation grid; and
securing a plurality of enclosure panels about a periphery of the at least one foundation grid so as to enclose the structure therein.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

The foundation system of the present invention will be described below in relation to its use and application in the erection and installation of towers and antennas for telecommunication applications. However, it will be appreciated that the foundation system of the present invention could be equally employed in supporting a variety of constructions. Similarly, whilst an embodiment for the present invention may be for the installation of towers under 10 meters in height in order to overcome the need for regulatory approval, the height of the tower may be any height depending upon the purpose of the tower, with towers in the range of 18 metres and 22 metres being common.

Figure 1:
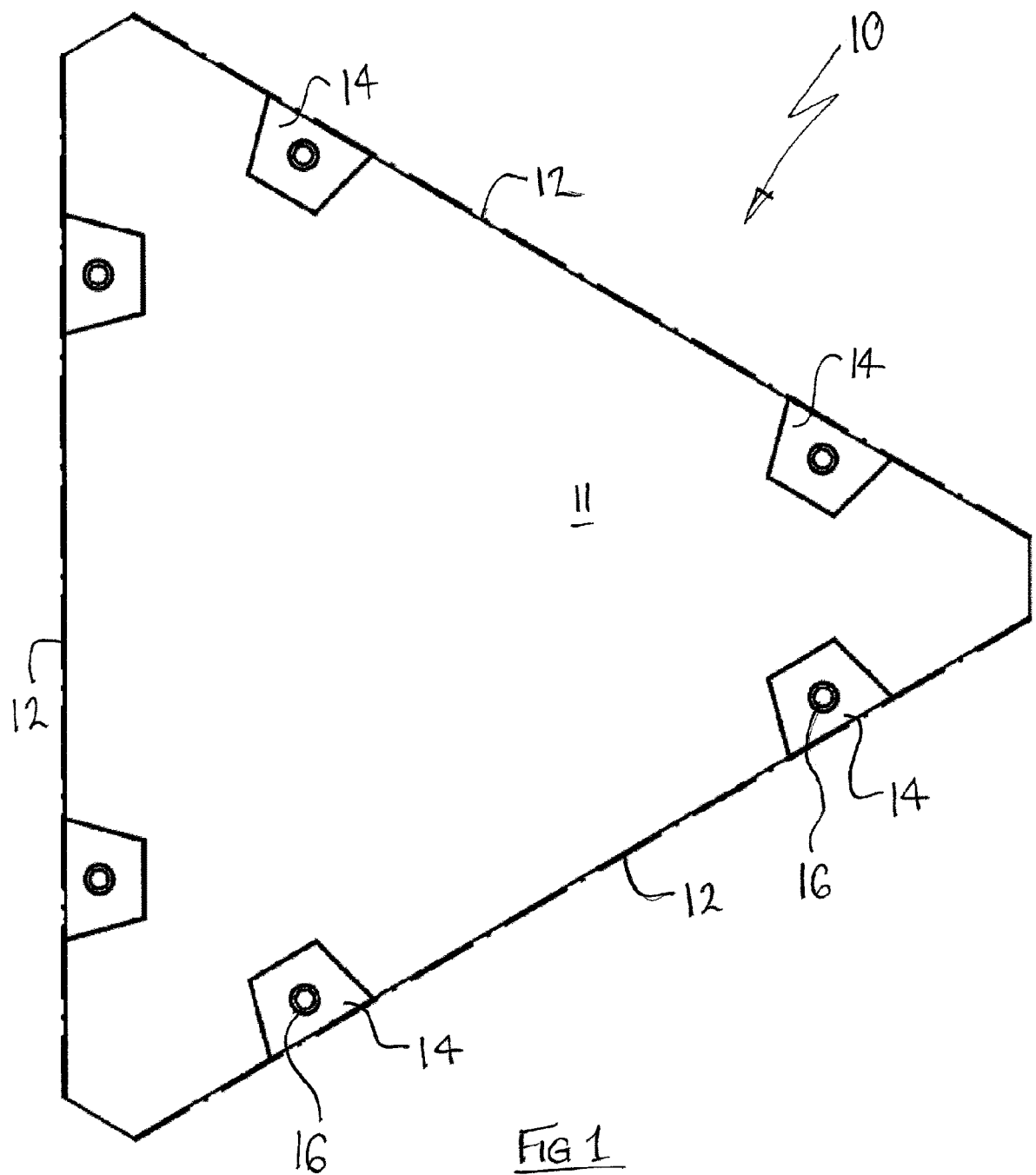
FIG. 1 is a plan view of a foundation block in accordance with an embodiment of the present invention.

Referring to FIG. 1, a block member 10 in accordance with an embodiment of the foundation system of the present invention is depicted. The block member 10 comprises a substantially triangular body 11 formed from concrete and which has three sides 12 defining vertical edges of the body 11.

A pair of recesses 14 are formed in the sides 12 of the body 10 at spaced intervals from the ends thereof. The recesses 14 are substantially trapezoidal in configuration and have a front edge that coincides with the side 12 which is substantially parallel with a rear edge thereof which is spaced inwardly from the side 12. Each of the other two sides of the recesses 14 are arranged in a converging manner from the rear edge to the front edge. A hole 16 is formed in the central region of the recesses 14 for receiving a pin member in a manner as will be discussed in more detail below.

Figure 2:
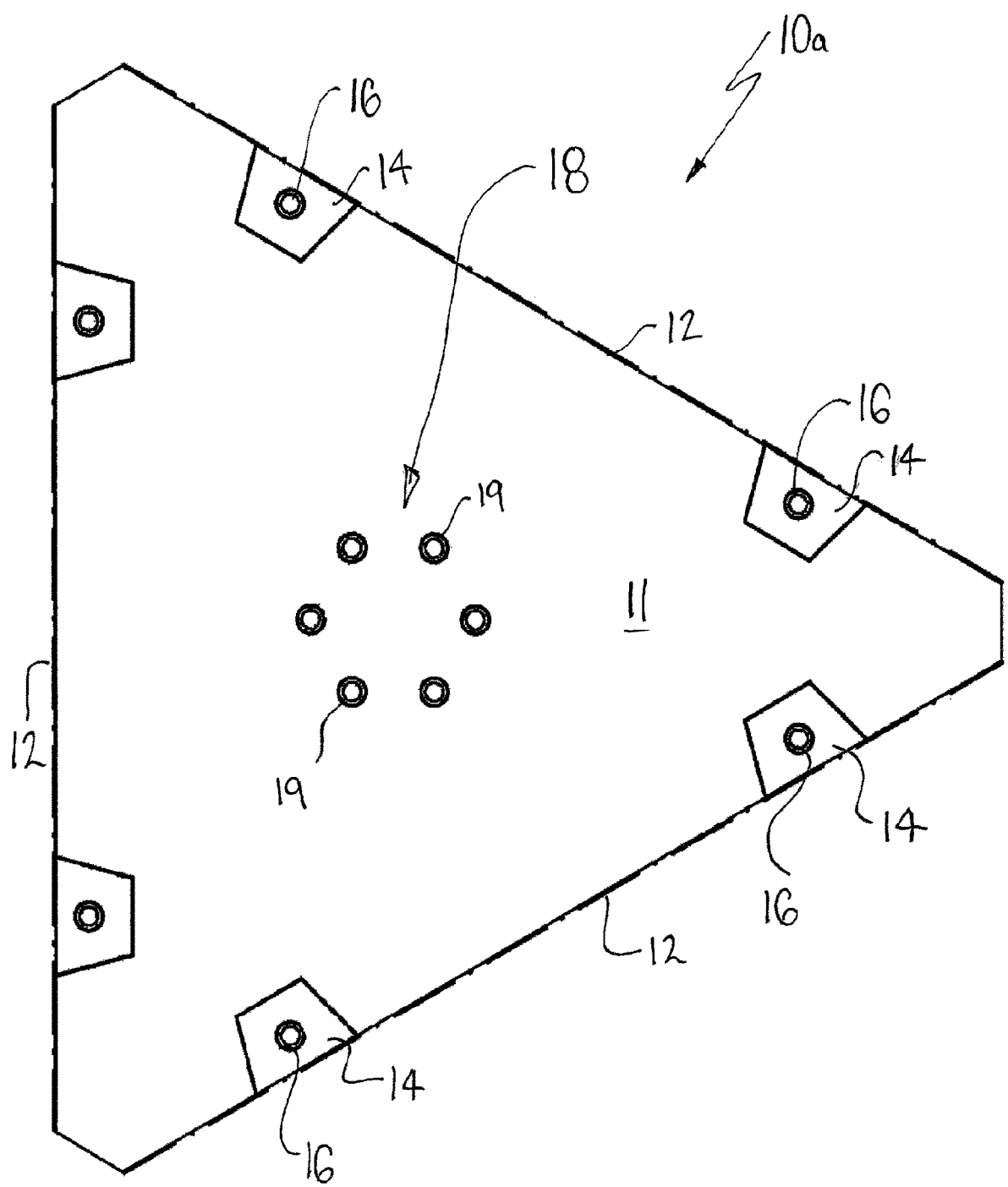
FIG. 2 is a plan view of a secondary foundation block in accordance with an embodiment of the present invention.

FIG. 2 represents a secondary block member 10a in accordance with an embodiment of the foundation system of the present invention. The secondary block member 10a is configured in substantially the same manner as block member 10 described above and the same reference numerals being used to refer to the same features. However, the exception being that the secondary block member 10a also comprises a central mounting system 18 located centrally thereon. The central mounting system 18 comprises a series of holes 19 formed in the surface of the secondary block member 10a in a circular manner. In the embodiment of the secondary block member 10a as depicted, six holes 19 are provided in a circular manner as shown. The purpose of the central mounting system will be discussed in more detail below.

Figure 3:
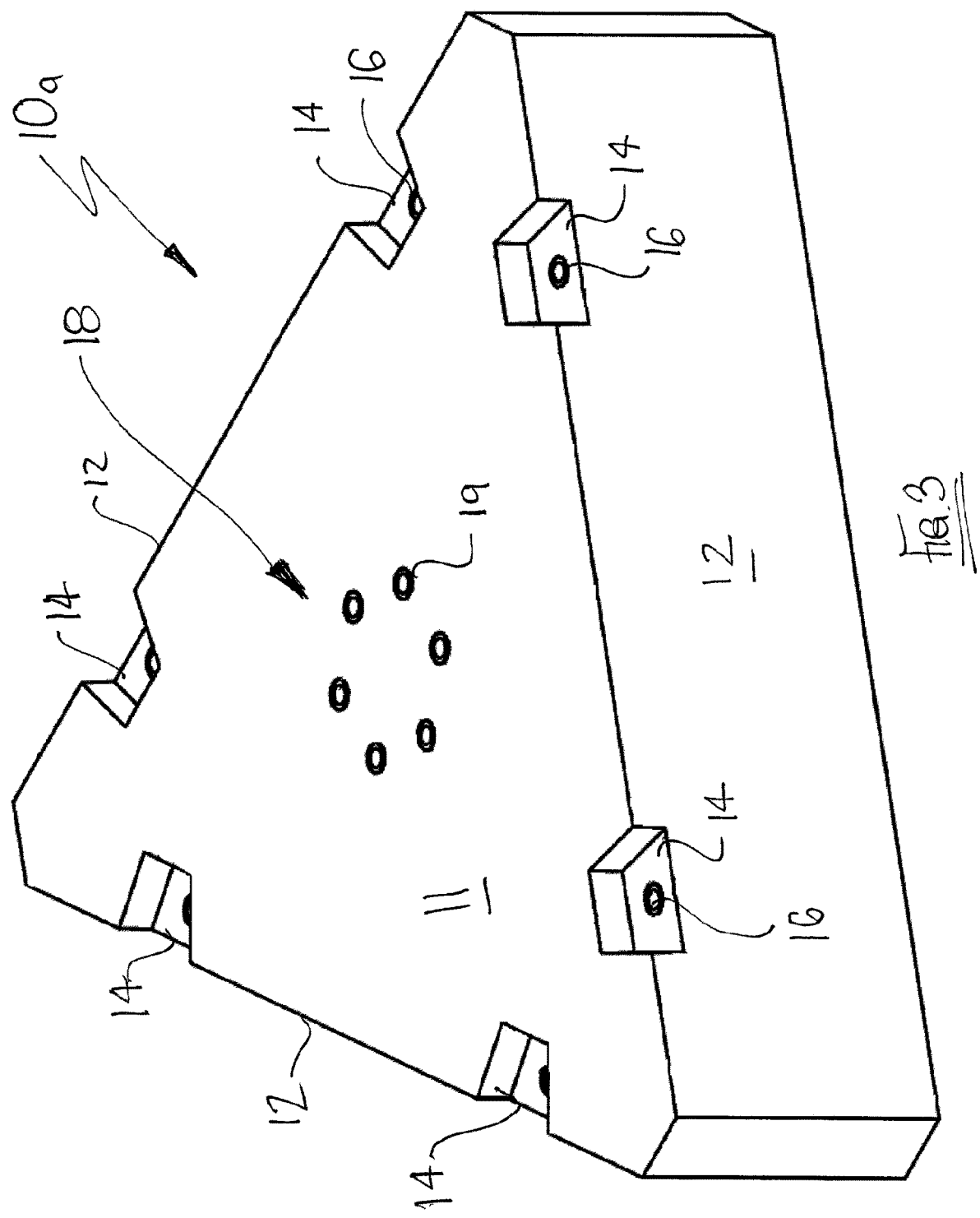
FIG. 3 is a perspective view of the secondary foundation block of FIG. 2.

FIG. 3 depicts a perspective view of the secondary block 10a. As is more apparent, the block 10 and secondary block 10a have a predetermined thickness which may be around 285 mm, although other thicknesses are also envisaged. The sides 12 each have a length of around 991 mm, with the ends of the triangle being truncated to form a square edge, as shown. In one embodiment, the recesses 14 have a depth or around 35 mm and the diameter of the central mounting system 18 is around 160 mm. It will be apparent that these measurements are only used by way of example and other dimensions may be employed based on different requirements of use of the foundation system.

Figure 4:
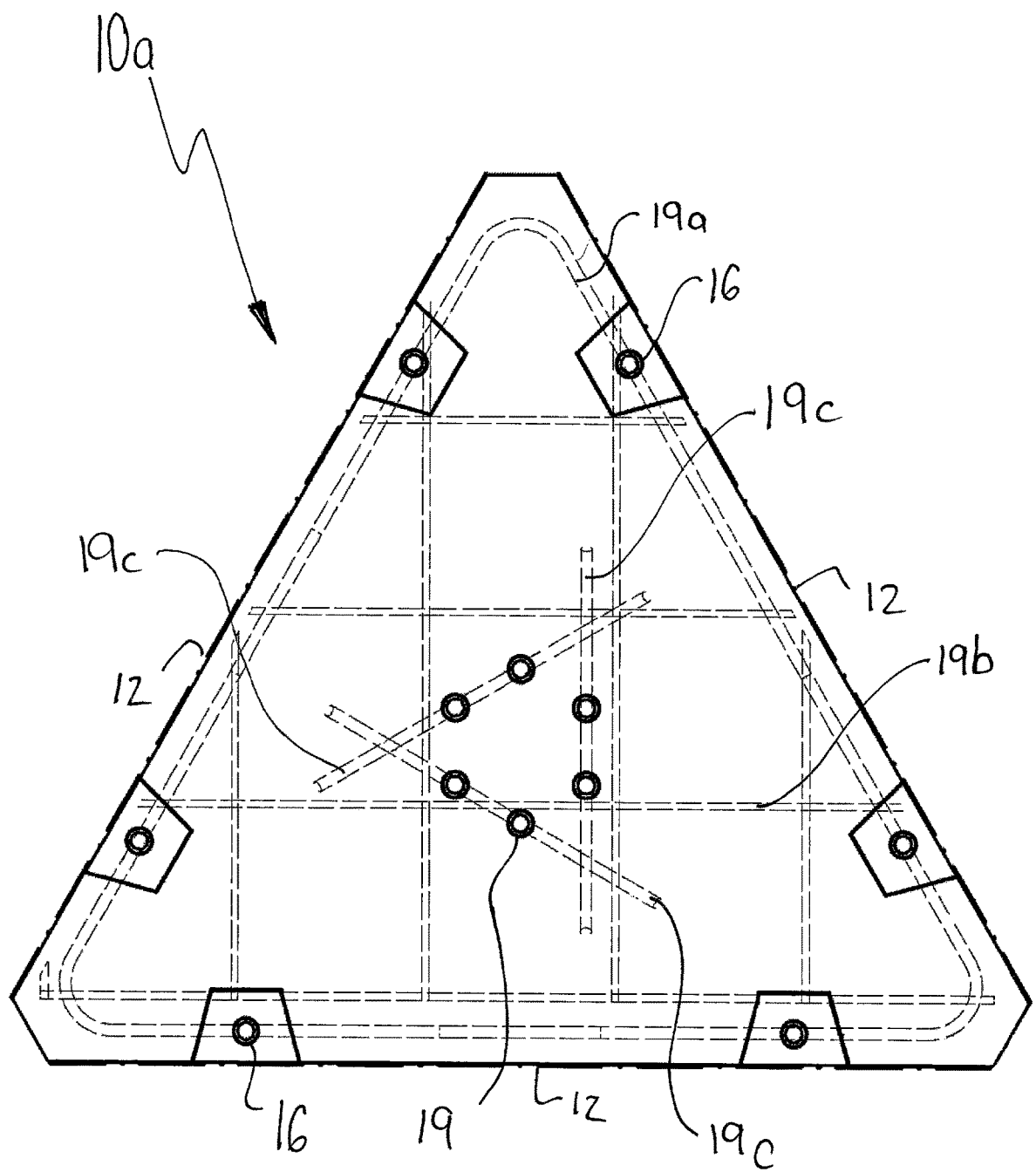
FIG. 4 is a plan view of the secondary foundation block of FIG. 2 showing the reinforcement present therein.

Referring to FIG. 4, the manner in which the block 10 and secondary block 10a is reinforced is shown. The block 10 and secondary block 10a comprise an upper reinforcement in the form of a steel rod 19a that extends around the periphery of the block 10, 10a so as to be located directly below each of the holes 16. A lower grid reinforcement 19b is also provided to improve the strength and load capacity of each block 10, 10a. For the secondary block 10a, three steel reinforcement plates 19c are located to extend below adjacent pairs of the holes 19 as shown.

Figure 5:
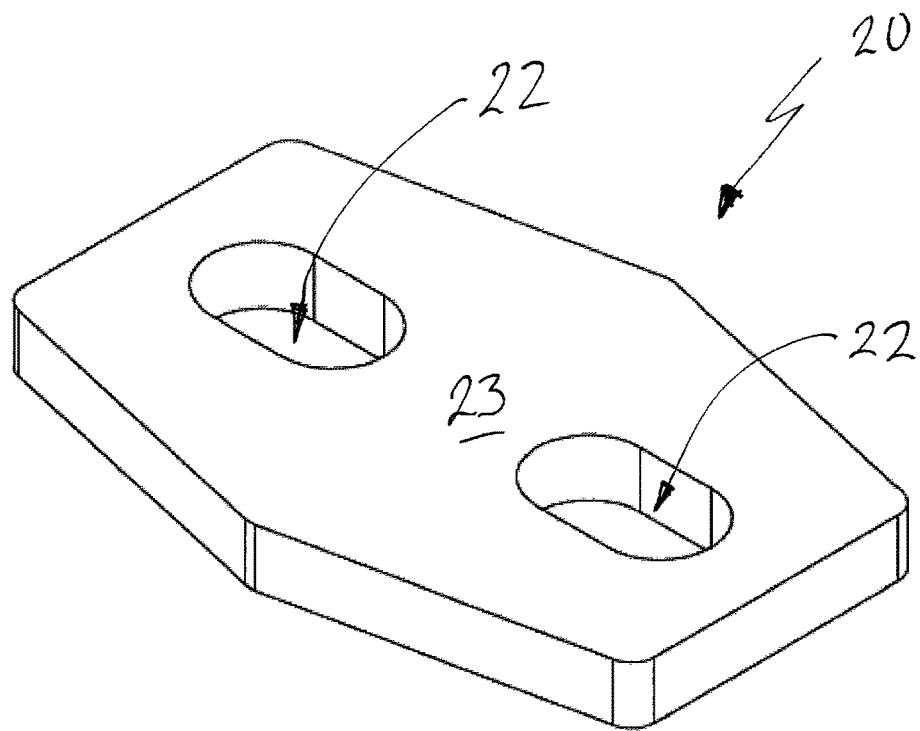
FIG. 5 is a perspective view of a connecting plate for connecting blocks of the foundation system of the present invention.
Figure 6:
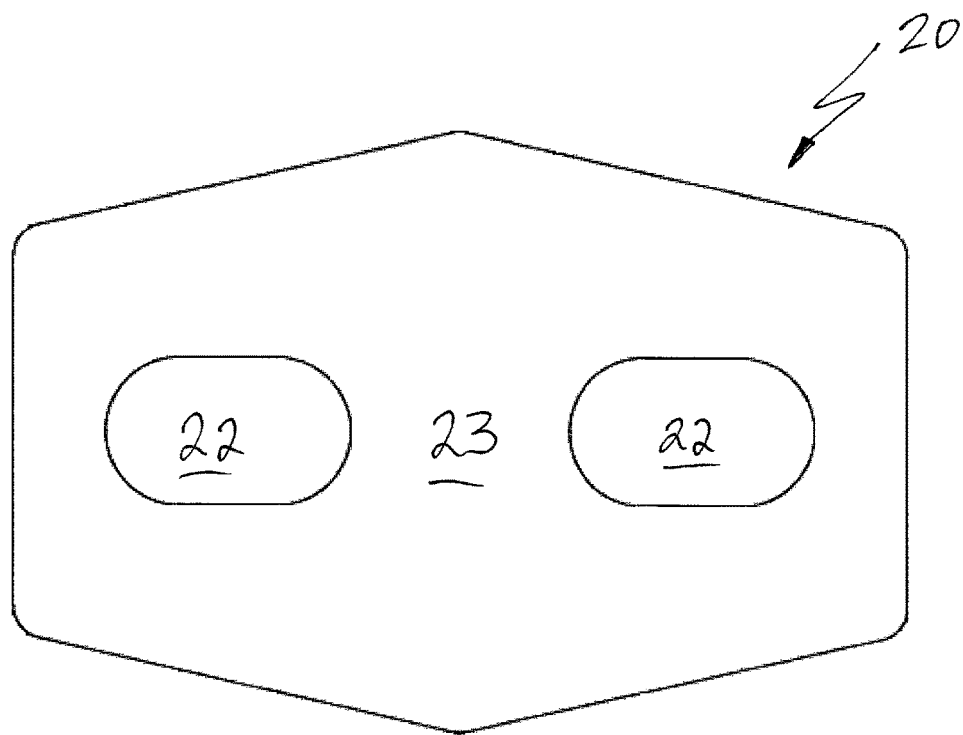
FIG. 6 is a plan view of the connecting plate of FIG. 5.
Figure 7:
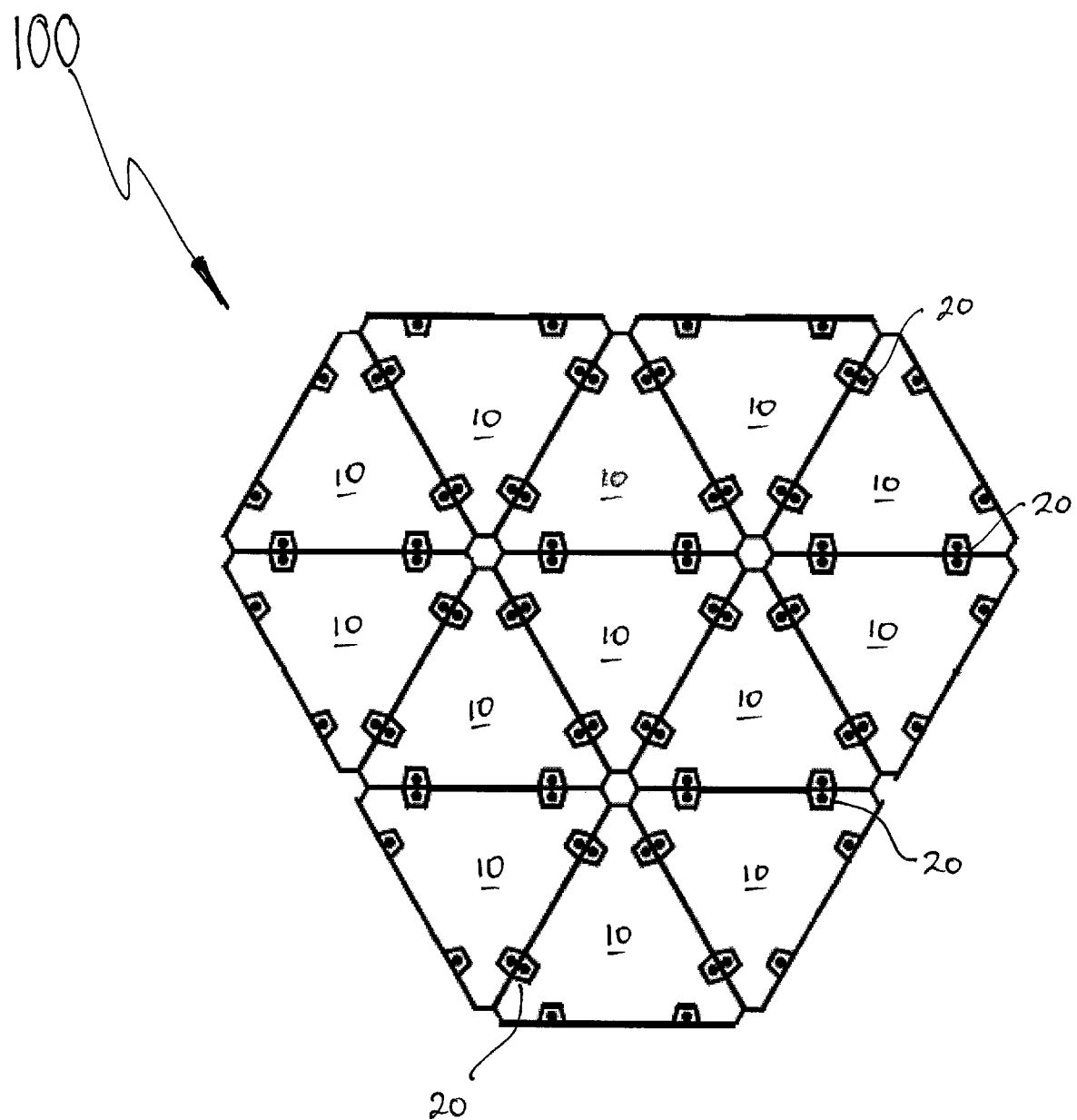
FIG. 7 is a top view of a foundation system in accordance with an embodiment of the present invention.

Referring to FIGS. 5 and 6, a connecting plate 20 in accordance with an embodiment of the present invention is shown. The connecting plate 20 is configured to extend between the recesses 14 in adjacent blocks 10 to facilitate connection of neighbouring blocks 10, in the manner as depicted in FIG. 7. In this regard, the connecting plate 20 has a body 23 that is of an irregular hexagon shape, with opposing ends of the body 23 configured with a trapezoidal shape that substantially conforms to the shape of the recess 14. As such, one end of the connecting plate 20 is able to be snugly received in a recess 14 of a block 10 and secured in position by a bolt which passes through the slot 22 formed in that end of the connecting plate and into the hole 16 formed in the recess 14 of the block 10. An adjacent block 10 can then be simply aligned alongside that block such that the free end of the connecting plate 20 is received in a recess 14 of the neighbouring block, at which stage a second bolt is used to secure that end of the connecting plate 20 to the hole 16 of the block thereby securing the two blocks together. By repeating this connecting at both connecting points or recesses provided along the adjacent sides of the blocks 10, a plurality of blocks are able to be connected together to form a unitary foundation system 100, as depicted in FIG. 7.

It will be appreciated by those skilled in the art, that the foundation system 100 of FIG. 7 has multiple blocks 10 each connected at multiple points to adjacent blocks to form a foundation base capable of sharing a load across the connected blocks 10. Along the perimeter of the connected blocks, one side 12 of the blocks is exposed with each side of the blocks 10 having two recesses 14 provided on the side thereof. Such a configuration of blocks 10 enables a connecting plate 20 to be secured to each block 10 around the perimeter to provide a point at which a fencing structure could be attached to enable the perimeter of the foundation system 100 to be enclosed. This will be described in more detail below.

Figure 8:
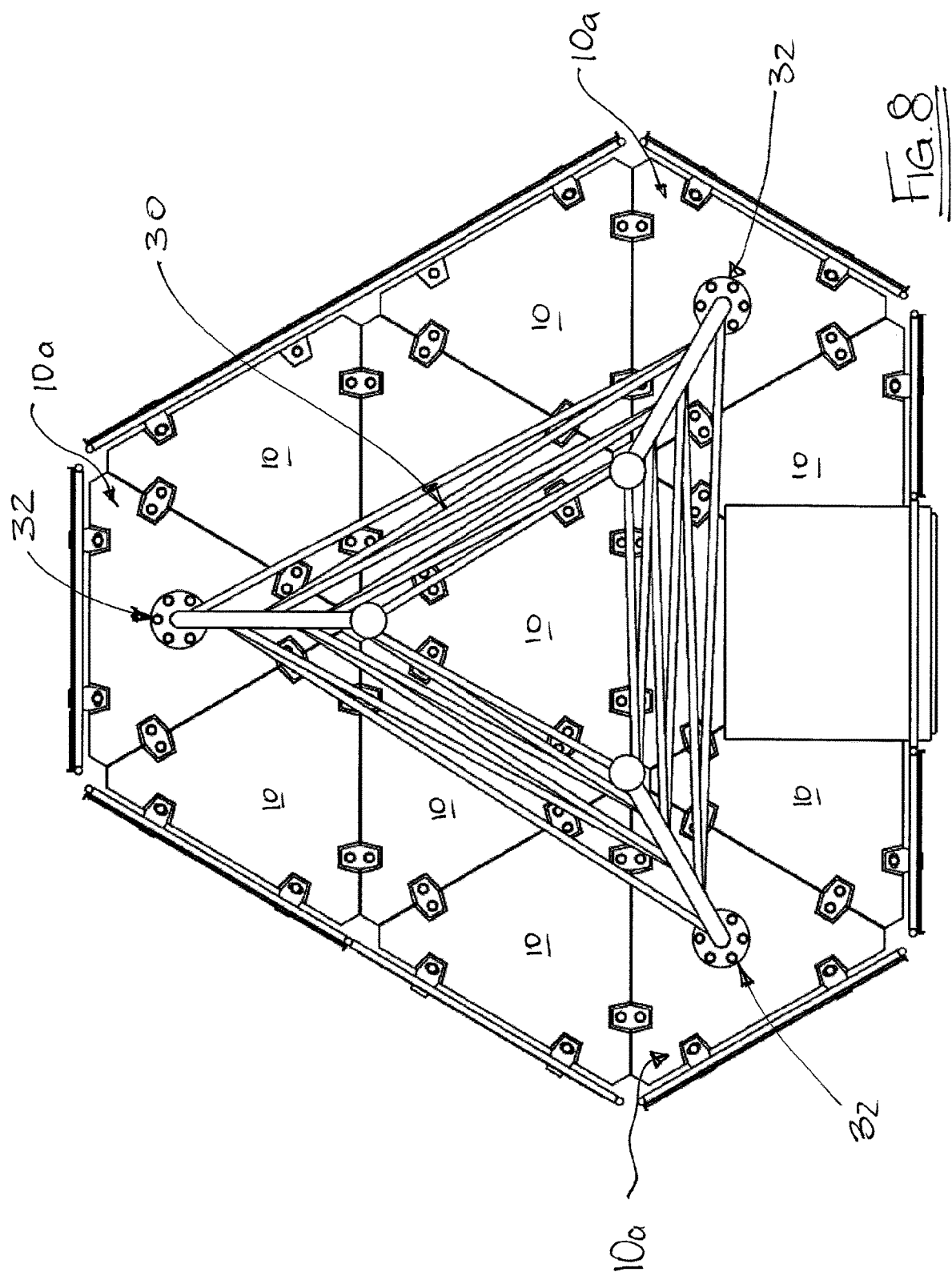
FIG. 8 is a top view of the foundation system of FIG. 7 in use supporting a tower structure thereon.
Figure 9:
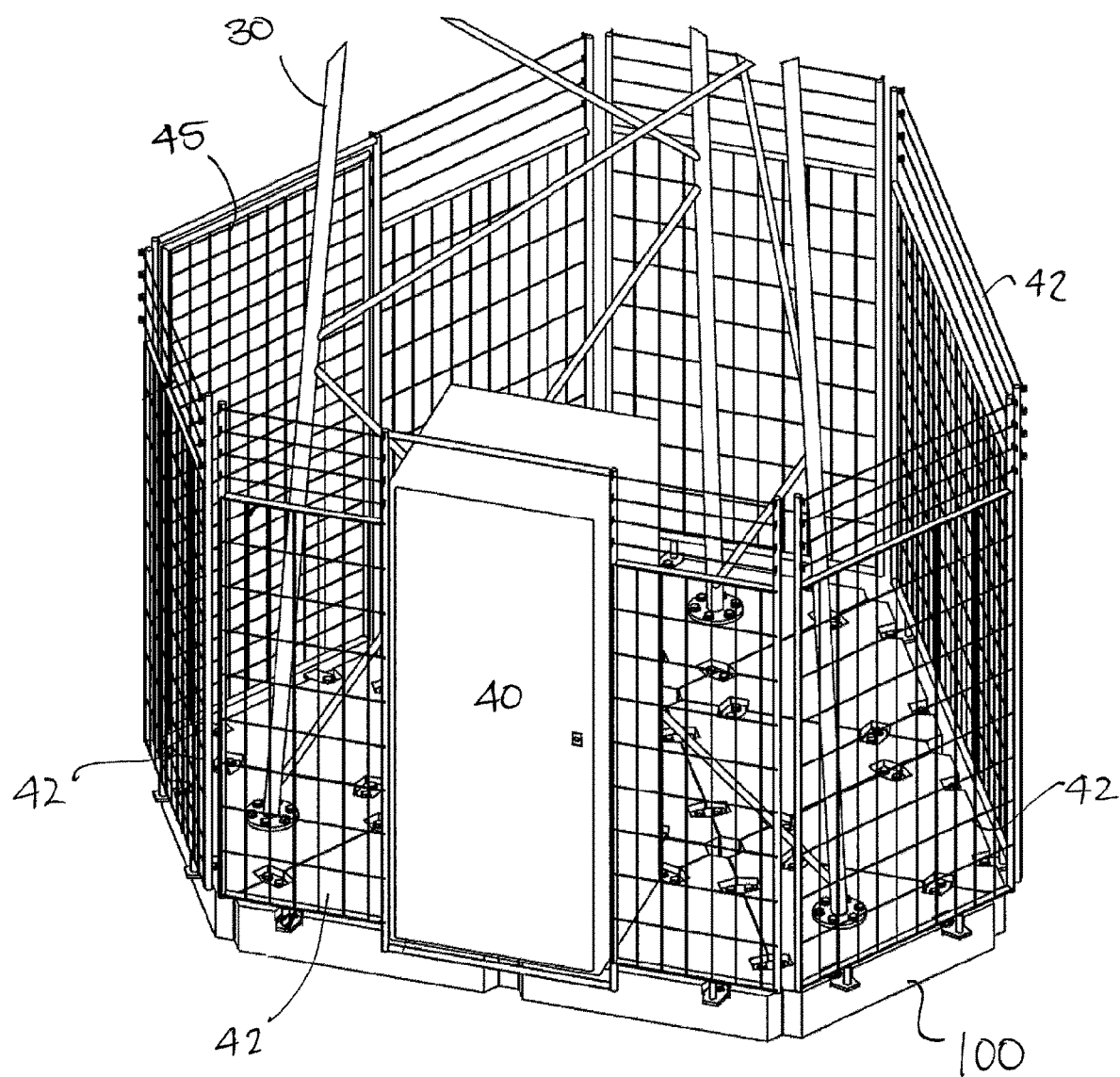
FIG. 9 is a perspective view of arrangement of FIG. 8.
Figure 10:
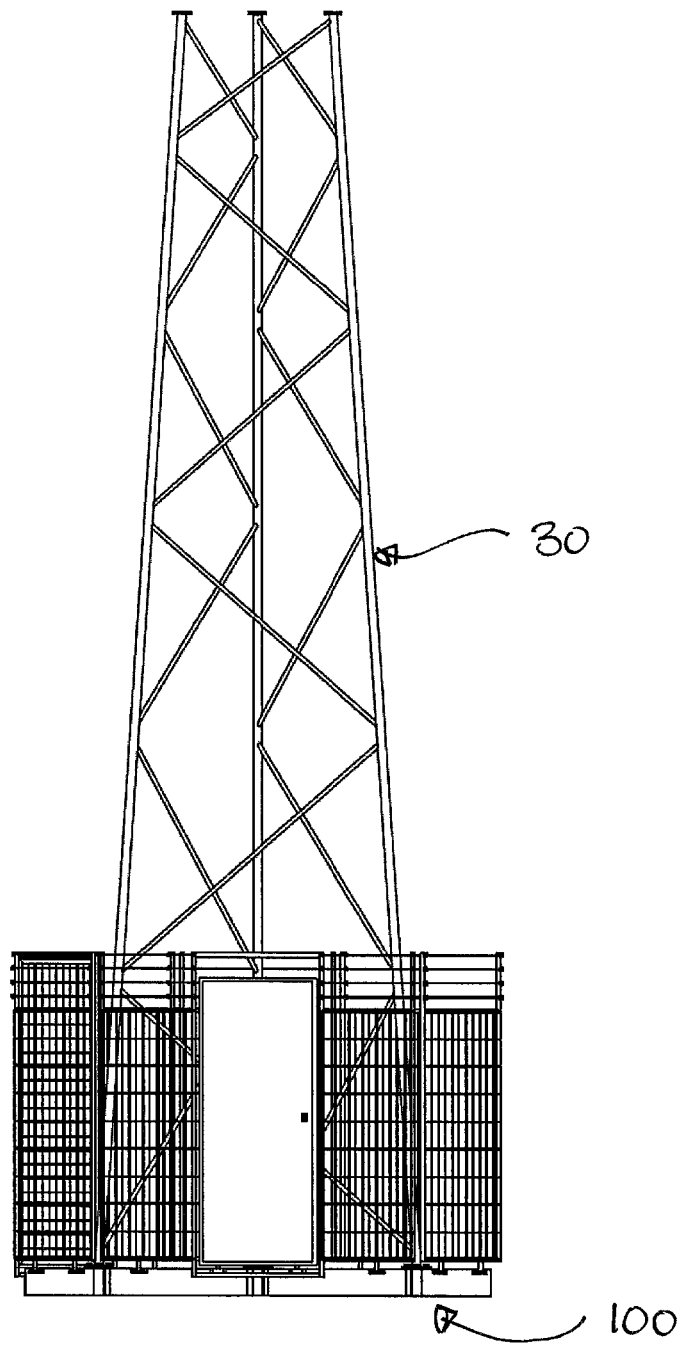
FIG. 10 is a side view of the arrangement of FIGS. 8 and 9.

Referring to FIGS. 8-10, an embodiment of a tower structure 30 erected on a foundation system 100 in accordance with the present invention is shown. The foundation system 100 is structured in substantially the same manner as described above in relation to FIG. 7, with the exception that each of the corner blocks 10 of FIG. 7 are replaced with a secondary block 10*a*.

The tower 30 has three feet members 32 that are each secured in position to the central mounting system 18 of each secondary block 10*a*. To secure the feet members 32 in position, bolts or similar fastening members are each passed through the holes formed in the feet members 32 to be secured within the holes 19 formed in the central mounting system 18 of the secondary blocks 10*a*. This provides a solid foundation for the tower 30 with the weight of the tower 30 being shared across each of the interlocked blocks that form the foundation system 100.

Upon securing the tower 30 in position, a control cabinet 40 can then be positioned on the foundation system 100 and mounted in place on the blocks 10 by way of attachment of an underside of the control cabinet 40 to a pair of connecting plates of a block 10 or adjacent blocks 10. This is shown more clearly in FIG. 9 where the control cabinet 40 extends across at least a portion of the perimeter of the foundation system 100. As is shown, the remainder of the perimeter of the foundation system 100 is able to then receive preformed fencing panels 42 to form a perimeter about the tower 30 to prevent unauthorised access to the tower 30. By attaching the fencing panels 42 to the perimeter of the blocks 10 of the foundation system 100, the fencing panels are securely mounted in position about the perimeter thereof in a simple and convenient manner, without the need to dig separate posts or supports or construct a fence in a conventional manner Simply, each of the components can be delivered onsite and assembled together upon formation of the foundation system 100. In this regard, in order to assemble the tower 30, a crane may be necessary to lift the parts of the tower to the required elevation for assembly, after which the fencing panels and control cabinet can be simply secured in position, ready for use, as is shown in FIG. 10. It will be appreciate that in order to facilitate authorised access to the tower 30 of FIGS. 8-10, one of the fencing panels 42 may be replaced by a gate panel 45 as depicted in FIG. 9. The gate panel 45 may comprise a lockable entry to facilitate controlled access to the tower for maintenance and the like.

It will be appreciated that the manner in which the foundation is structured will depend on the type and size of the structure it is to support, as well as the space available to accommodate the foundation system.

Figure 11:
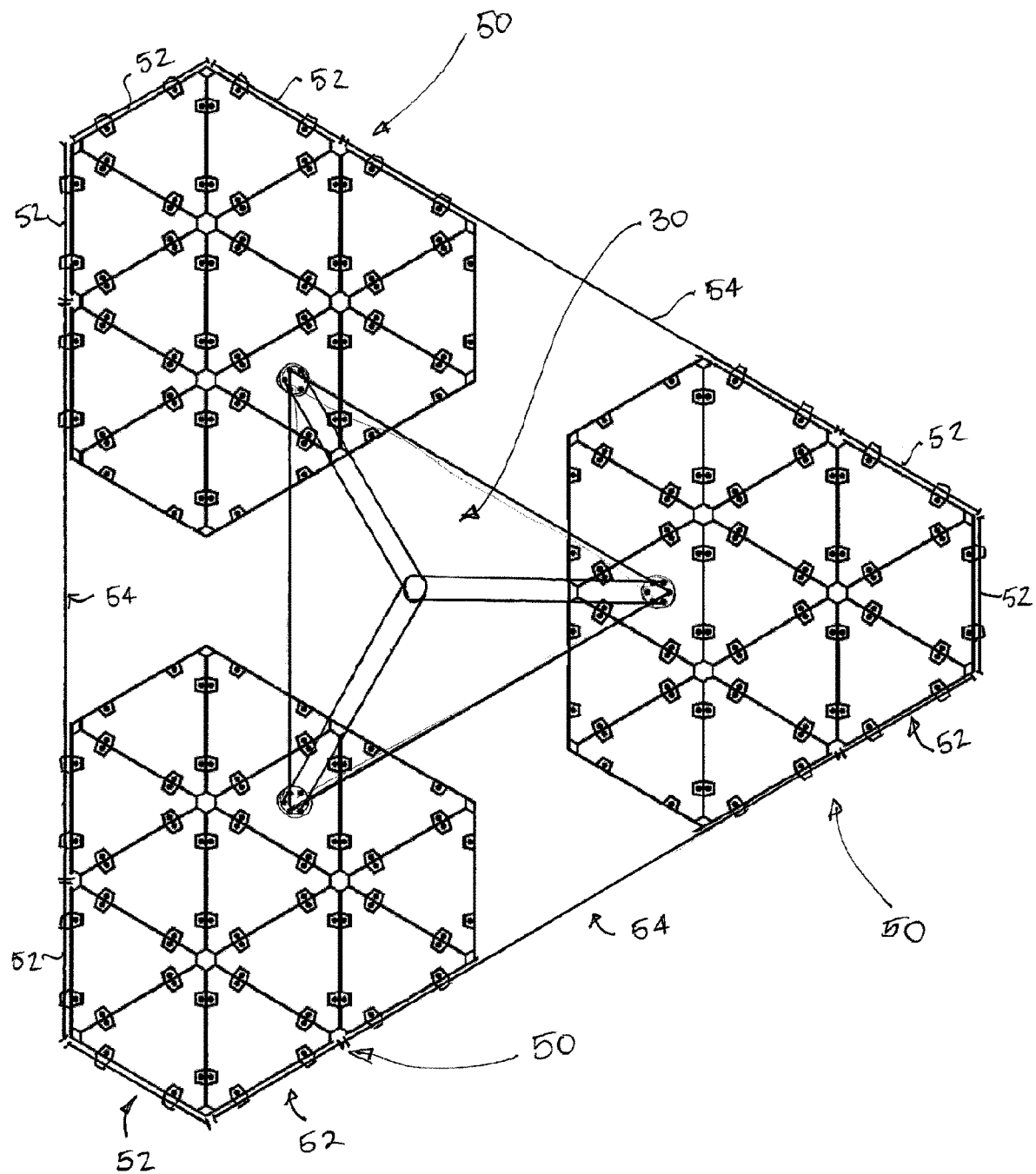
FIG. 11 is a top view of an alternative embodiment of a foundation system of the present invention supporting a tower, in use.

One alternative embodiment of a foundation system for supporting a tower structure 30 is depicted in FIG. 11. In this embodiment, three separate foundation grids 50 are formed, each grid having a secondary block 10*a* for receiving a foot member of the tower structure 30 such that the weight of the tower structure is shared over the three foundation grids 50. The ground surface supporting the three grids 50 will require levelling and preparation to ensure that the grids are all level, however, the ground surface between the grids 50 may be left untouched, thereby minimising impact to the environment.

As is shown in FIG. 11, in order to assemble a fence structure about the perimeter of the system, nine small fence panels 52 and three long fence panels 54 are required to enclose the system and prevent unauthorised access to the tower 30. One of the nine small fence panels may include a gate to permit authorised access to the tower 30, as required. These panels can all be pre-formed prior to delivery to the site and may be enclosed or open in structure depending upon the requirements of the installation.

For particularly remote sites that are not readily able to be connected to a mains power grid, the foundation system may be required to not only support a communications tower or aerial but also a power generator, in the form of a solar or wind power generator. Similarly, in such instances it is important to provide a secure site that minimises access of wildlife or unauthorised personnel to the site which may have an adverse effect on the solar or power generator. Such a system is depicted in FIGS. 12 and 13.

Figure 12:
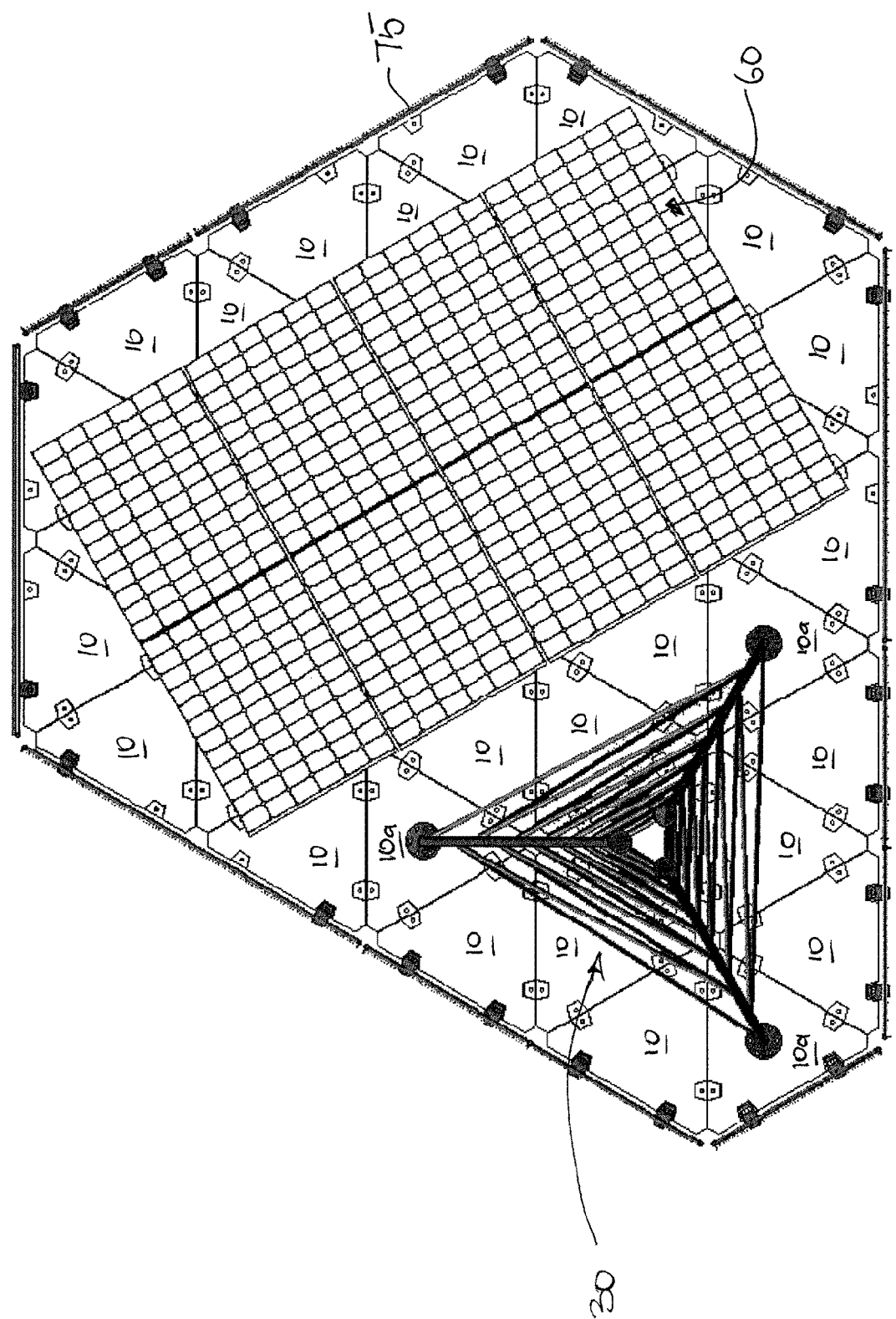
FIG. 12 is a top view of yet another embodiment of a foundation system of the present invention supporting a tower and power generator, in use.
Figure 13:
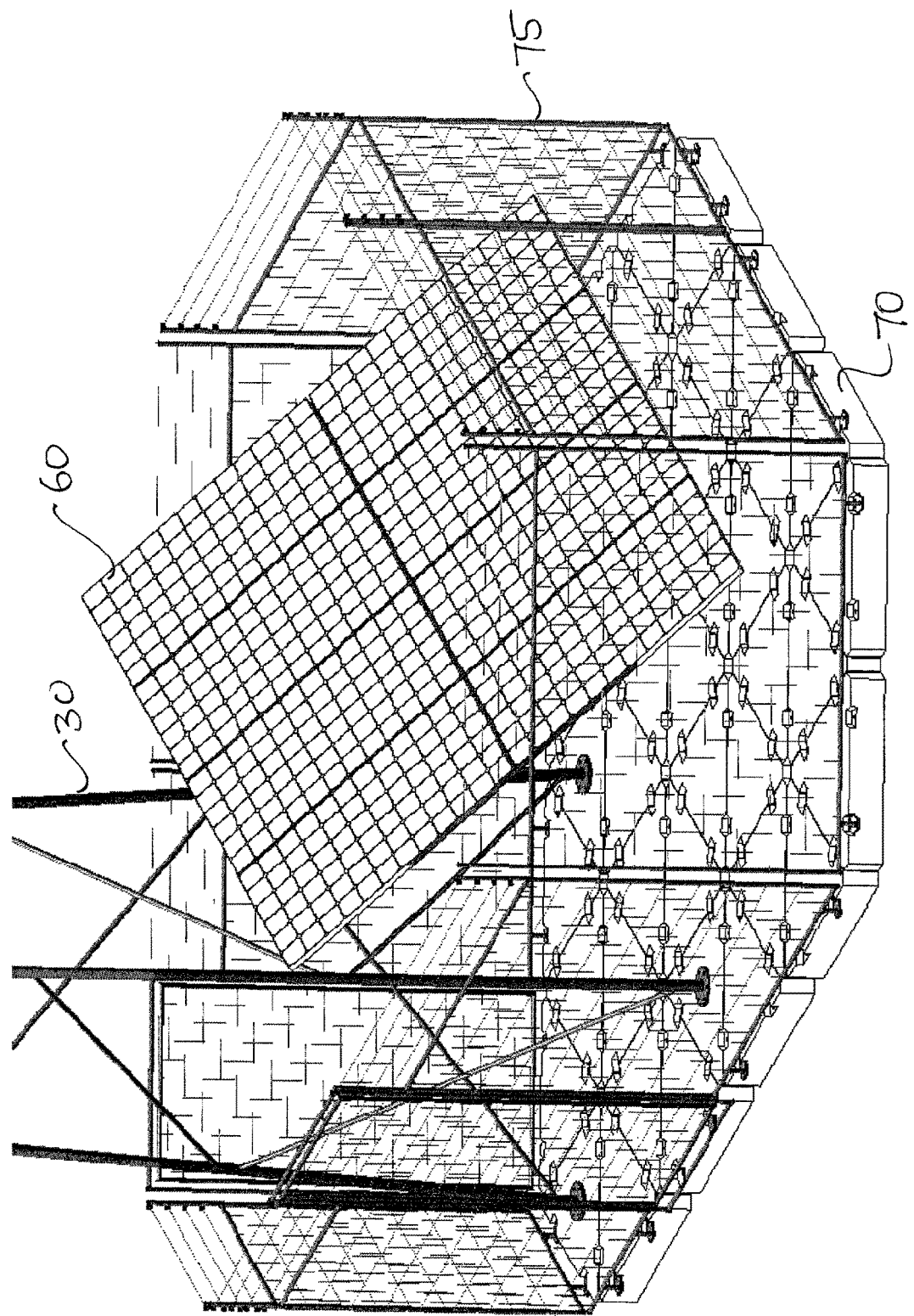
FIG. 13 is a perspective view of FIG. 12.

In the embodiment as depicted in FIGS. 12 and 13, a solar panel power generator 60 is employed to generate power to operate the system. Blocks 10, 10*a* are arranged in the manner as shown to form a foundation 70 that supports the tower 30 and the solar panel power generator 60. A fence structure 75 in the form of multiple preformed panels is then mounted about the perimeter of the foundation 70 to enclose the system and prevent unauthorised access to the system. It will be appreciated that one of the multiple pre-formed panels may include a gate panel to facilitate controlled access to the system as required.

Irrespective of the type of system employed with the present invention, the system is erected with the use of pre-formed blocks and pre-formed panels to form a fence structure about the foundation created. The type of fence panels employed may vary depending upon requirements and may include barbed wire or electric wire to prevent animal access if required.

The system of the present invention can be readily transported to a remote site and assembled with minimal labour. The site can be simply levelled prior to forming and interlocking the foundation system and can be adapted to accommodate a variety of different types of sites.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The invention claimed is:

1. A foundation system for supporting a structure thereon comprising:
    a plurality of blocks, each block having at least three sides;
    at least two recesses formed in each of the at least three sides of each block, the at least two recesses being formed in an upper surface of each block;
    a plurality of connecting plates having a first end configured to be secured within a recess of a first block and a second end configured to be secured within a recess of an adjacent block such that the connecting plate extends along an upper surface of the blocks between recesses of adjacent blocks to secure adjacent blocks together to form a foundation grid comprising a single layer of said blocks having said recesses formed around a perimeter of the foundation grid; and
    enclosure panels mountable to the recesses formed around the perimeter of the foundation grid so as to form an enclosure about a perimeter of the foundation grid.

2. The foundation system according to claim 1, wherein the structure is supported on the foundation grid of said blocks.

3. The foundation system according to claim 2, wherein at least one of the blocks of the foundation grid is configured to receive a foot member of the structure.

4. The foundation system according to claim 3, wherein the at least one block of the foundation grid is configured to have mounting system formed on a surface thereof to engage with the foot member of the structure.

5. The foundation system according to claim 4, wherein the mounting system comprises a plurality of holes formed in a central region of the block with each hole configured to receive a bolt for securing the foot member of the structure to the block.

6. The foundation system according to claim 4, wherein a plurality of blocks within the foundation grid are configured to comprise the mounting system for supporting each foot member of the structure upon said foundation grid.

7. The foundation system according to claim 4, wherein a single block of a foundation grid is configured to comprise the mounting system for supporting a foot member of the structure such that the structure is supported across a plurality of foundation grids.

8. The foundation system according to claim 1, wherein each of the blocks are reinforced.

9. The foundation system according to claim 1, wherein the blocks are substantially triangular in configuration.

10. The foundation system according to claim 1, wherein the recesses are formed in the sides of each block adjacent an upper surface of the block.

11. The foundation system according to claim 10, wherein the recesses are shaped to conform to the shape of the first end or second end of the connecting plate to be received in the recess such that when the connecting plate is received in the recess there is limited lateral movement of the connecting plate within the recess.

12. The foundation system according to claim 10, wherein the recesses have a hole formed therein that aligns with a hole formed in the first end or second end of the connecting plate to facilitate securing of the connecting plate within the recess by a securing member.

13. The foundation system according to claim 1, wherein the connecting plates have holes formed in both the first end and second end thereof.

14. The foundation system according to claim 1, wherein the enclosure panels are mountable to a free end of said connecting plates.

15. The foundation system according to claim 14, wherein the base of the enclosure panels is mounted to the connecting plates.

16. The foundation system according to claim 1, wherein the enclosure panels may comprise an open structure, a closed structure or a combination of both an open structure and a closed structure.

* * * * *